United States Patent
Hoshino et al.

[15] 3,687,913
[45] Aug. 29, 1972

[54] CONTINUOUS PROCESS FOR THE PREPARATION OF LIVING POLYMER

[72] Inventors: Yutaka Hoshino; Yoshikazu Iwaki; Koshiro Matsukawa; Akira Nakada; Fumio Sato; Kazuo Uno, all of Niigata, Japan

[73] Assignee: Nippon Soda Co., Ltd., Tokyo, Japan

[22] Filed: March 6, 1970

[21] Appl. No.: 17,301

[52] U.S. Cl. ............... 260/82.1, 260/82.3, 260/83.5, 260/83.7, 260/95 R, 260/94.2 M
[51] Int. Cl. ........................... C08d 3/06, C08d 3/08
[58] Field of Search ........ 260/94.2 M, 95, 83.7, 82.3, 260/83.5, 82.1

[56] References Cited

UNITED STATES PATENTS

| | | | |
|---|---|---|---|
| 3,074,924 | 1/1963 | Kizer et al. | 260/94.2 X |
| 3,458,491 | 6/1969 | Dennis | 260/94.2 |
| 3,488,332 | 1/1970 | Hiraoka et al. | 260/94.2 |
| 3,488,340 | 1/1970 | Hiraoka et al. | 260/94.2 |

*Primary Examiner*—Joseph L. Schofer
*Assistant Examiner*—William F. Hamrock
*Attorney*—George B. Oujevolk

[57] ABSTRACT

Conjugated diolefin polymer having a narrow molecular weight distribution and a well coincident value of an average molecular weight with the expected value calculated from a molar ratio of monomer to initiator is continuously produced by employing a tubular reactor having a plural number of monomer inlets, the initiator being passed through from one end to the other end and the monomer diluted with aliphatic or cycloaliphatic hydrocarbon being fed from the monomer inlets, at a temperature maintained between $-20°\,C$ and $-80°\,C$.

6 Claims, No Drawings

CONTINUOUS PROCESS FOR THE PREPARATION OF LIVING POLYMER

DETAILED EXPLANATION OF THE INVENTION

This invention relates to a process for the preparation of living polymer and more particularly is concerned with a continuous process for the preparation of living conjugated diolefin polymer using a metallic alkali dispersion or complex compound thereof as a polymerization initiator.

Living polymerization which comprises polymerizing styrene or a conjugated diolefin such as butadiene or isoprene in the presence of a polymerization initiator consisting of a Lewis base compound having no active hydrogen atom and dispersed metallic alkali or, a complex compound thereof, having active carbanions which is derived from the reaction between the monomer or specified aromatic compounds and the metallic alkali is well known. Since the living polymer has a terminal active carbanion at both ends, when the monomer is added, further chain propagation takes place and when electrophilic reagent such as alkylene oxide, carbon dioxide or ethylene sulfide is charged, introduction of functional groups to the polymeric chain can be attained. Further, it well known that the polymer is theoretically characterized by having a narrow molecular weight distribution, an average molecular weight substantially in accord with the theoretical value calculated from an equivalent ratio of the initiator to the monomer and an expected content of the functional group in the case of treating with an electrophilic reagent, because an unfavorable side reaction, such as a chain transfer reaction or termination of living end, is practically avoided by conducting at a low enough temperature and using raw materials of high purity.

However, when we conducted the above reaction in a large scale batch process, the resulting polymer did not always have the ideal value in the distribution, the average molecular weight and functionality (content of functional group), and therefore it appeared that the chain transfer reaction or termination of the active living end takes place considerably in the polymerizing operation.

Thus, one of the object of the present invention is to provide a continuous process for preparing a living polymer which is convenient and economical to operate on a commercial scale. Another object of the invention is to provide a living polymer having an extremely narrow molecular weight distribution and an average molecular weight which coincides well with the theoretical value. A still further object of the invention is to provide a living polymer having functional groups on substantially both ends of the polymeric main chain. Other and additional objects will become apparent from the following specification and claims.

We practiced an intensive and precise study on living polymerization and found that the exhaust of reaction heat is relatively large and abrupt and the resulting local elevation of temperature brings about the chain-transfer reaction and that the occurance of the side reaction is not affected by the concentration of the monomer in the reaction mixture but occurs in proportion to the residence time of the reaction mixture in the reactor. Therefore, when living polymerization is performed on a commercial scale, it is necessary to so use the apparatus in which the reaction heat is generated that it is removed immediately and the distribution of the residence time is possibly narrow in order to prevent the living polymer from staying unnecessarily in the reactor after completing the chain propagation. Furthermore, a continuous process can be realized for carrying out living polymerization on a commercial scale taking into consideration quality control of the product and the economical aspects that require mass production with a small labor staff. Consequently, from the aforementioned viewpoint, we came to the conclusion that the commercial apparatus for living polymerization should be a tubular reactor having no stirring or agitating means and provided with a number of the monomer inlets fixed to the tube in an axial direction at moderate intervals and that the polymerization initiator containing dispersed metallic alkali and a Lewis base compound or containing a complex compound derived from the reaction between the metallic alkali and the conjugated diolefin or specified aromatic compound should be charged from one end of the tubular reactor, and monomer is divided and fed through the monomer inlets.

However, when we carried out the living polymerization by the above tubular reactor, we observed that the concentration of the monomer in the reaction mixture was temporarily increased around the monomer inlets and an extremely high polymer with a molecular weight of 50,000 to 200,000 was locally generated which resulted in blocking up the inlet and forced suspension of the operation. Furthermore, the extraordinary elevation of the temperature around the monomer inlets stemed from the chain transfer reaction and the molecular weight distribution of the resulting polymer became broad. No matter what we tried regarding the shape of the inlet in order to instantly distribute the monomer after introducing it into the reactor, couldn't bring success.

We continued further a diligent investigation in order to solve the problem of the tubular reactor for the living polymerization and discovered that when a diluted monomer solution with 40 to 90 parts, based on the 100 parts of the butadiene, of inactive aliphatic or cycloaliphatic hydrocarbon solvent, having more than four carbon atoms is employed, in lieu of the monomer by itself, the blockage and the local heating is avoided, the apparatus can be operated without any trouble and a polymer having substantially ideal characteristics as a living polymer is obtainable. Moreover, we also discovered that a BB fraction can be applied in lieu of the diluted monomer solution.

It is a matter of importance that the effect of the present invention can be attained only by use of the foregoing specific hydrocarbon diluent and if another solvent such as an aromatic solvent or a Lewis base solvent, which is notwithstanding common with the solvent of polymerization initiator, is employed instead of the foregoing hydrocarbon diluent, the problems regarding the operation and the final product including blockage, local heating, broad distribution of molecular weight, and non-conformity with the expected average molecular weight cannot be avoided.

The inert hydrocarbon diluent to be used together with the monomer includes saturated aliphatic hydrocarbons having a relatively lower boiling point such as butanes, pentanes, hexanes, heptanes and octanes, unsaturated aliphatic hydrocarbons having a relatively lower boiling point such as butanes, pentenes, hexenes, heptenes and octenes, cycloaliphatic hydrocarbons such as cyclopentane, cyclohexane, cylopentene and cyclohexene or mixture thereof, but hydrocarbons having a higher molecular weight are not favorable because the higher boiling point makes it difficult to complete the removal of the hydrocarbon from the product. Typical hydrocarbon mixtures used in the present invention are petroleum ether, solvent naphtha and industrial gasoline, and when the recovery equipment for a relatively higher boiling solvent is used, gasoline containing no lead, mineral spirits and kerosene can also be employed. The quantity of the hydrocarbon diluent to be added to the monomer is determined so as to be in the range of from 10 to 70 percent and preferably from 20 to 50 percent of the butadiene content. On the one hand, a higher content, i.e., over 70 percent cannot prevent blockage of the reactor, and on the other hand, a lower content below 10 percent results in an economic disadvantage.

The BB fraction which can be used in the present invention in place of the diluted monomer is defined as follows: BB fraction comprises a $C_4$ fraction obtained by fractional distillation of cracking gas which is produced by catalytic or thermal cracking of naphtha, crude petroleum oil and other petroleum fractions, $C_4$ fraction obtained by dehydrogenation of $C_4$ paraffins and $C_4$ olefins, or a residual fraction obtained by partially extracting some constituent from the foregoing $C_4$ fraction and they are a mixture consisting of butadiene, butane, butene, butylene and can contain a small quantity of other minor constituent such as $C_3$ and $C_5$ hydrocarbons.

A typical example of the composition of the BB fraction is presented in Table 1.

TABLE 1.

Constituent

| | | mole |
|---|---|---|
| Propane | 0–1 | percent |
| Propylene | 0–5 | - do - |
| n-Butane | 1–50 | - do - |
| Iso-butane | 1–20 | - do - |
| Butene-1 | 10–60 | - do - |
| Trans-butene-2 | 1–20 | - do - |
| Cis-butene-2 | 1–20 | - do - |
| Iso-butylene | 1–50 | - do - |
| 1,3-Butadiene | 10–60 | - do - |
| 1,2-Butadiene | 0.02–0.2 | - do - |
| $C_5$-hydrocarbons | 0–2 | - do - |
| Acetylene | 0–0.2 | - do - |
| Sulphur | 1–15 | p.p.m. |

The BB fraction can as a matter of course, be together with the inert hydrocarbon diluent within the range of the content defined above.

Further, a conjugated diolefin monomer other than butadiene such as isoprene also can be applied to the present invention, and vinyl compound such as styrene, α-methyl styrene, methoxy styrene, methacrylates, acrylates and acrylnitril are used together with the conjugated diolefin monomer.

The tubular reactor of this invention consists of a tube provided with an initiator inlet at one end, a reaction mixture outlet at the other end and a plural number of monomer inlets fixed on the tube in an axial direction in the moderate intervals, and equipped with conventional cooling means such as a jacketing or a bath. The tubular reactor is usually composed of the plural number of pipes joined in series and can be used combining in series or in parallel depending on the polymerization conditions.

The diameter and length of the reactor must be determined by taking into account the residence time so as to be in the range of 20 minutes to 20 hours, with enough heat transfer surface so as to keep the temperature within the range between −20° and −80° C and of a linear flow rate of the reaction mixture in the reactor so as to be in the range of 0.1 to 3 m/sec for the purpose of preventing back mixing. When the diameter of the tube is too large, local circulation possibly occurs and results in a chain transfer reaction. In order to raise the space efficiency, the tube composing the tubular reactor is fabricated in the form of a coil or trombone. The reactor can be divided in to a few sections and each section may be cooled by a different temperature and cooling medium in accordance with the heat generation.

In order to avoid the addition of a large quantity of the monomer at one time to the reaction initiator, a plural number of monomer inlets are indispensable and the diluted monomer is divided and added in one inlet after another in accordance with the progress of the polymerization reaction. Usually 4 to 30 of the monomer inlets are preferably furnished. The interval between the monomer inlets is determined by taking into consideration the heat transfer surface and the fact that heat generated by the introduction of the monomer through a previous inlet must be removed before the reaction mixture reaches the next inlet. In other words, the temperature of the reaction mixture in front of the every inlet is preferably kept below −50° C and at a point beyond of the inlet the temperature should not be over −20° C. Although a particular shape for the monomer inlet is not required, the inlet tube composed of a pipe having a diameter smaller than that of a reactor tube is preferable. The inlet tube is inserted from the wall of the reactor tube and bent with its top in a stream direction in such a manner that the reaction mixture and introduced monomer are flown in a concurrent direction. At the opening of the monomer inlet, any kind of a diffuser can be provided if desired.

One type of polymerization initiator employed in the present invention is composed of a dispersed metallic alkali, Lewis base compound and, if desired, aromatic hydrocarbon activator having multi-nucleuses or a condensed ring and/or inert hydrocarbon diluent. The other type of polymerization initiator is composed of a Lewis base compound and an alkali metal complex compound which is produced by the reaction between the conjugated diolefin, styrene, α-methyl styrene, the aromatic hydrocarbon activator or mixture thereof and the former type of polymerization initiator, and may contain, the dispersed metallic alkali and an inert hydrocarbon diluent.

Lithium, sodium, potassium, rubidium, cesium, their alloys with other metallic alkali or metallic alkali earth, and mixtures thereof are included as the metallic alkali of this invention. They are employed in the form of small particles of which the diameter is less than $50\mu$ and less than $20\mu$ on the average.

The activators which can be used in this invention includes condensed ring aromatic hydrocarbons such as anthracene, naphthalene and phenanthrene; polynuclear aromatic hydrocarbons consisting of non-condensed rings such as biphenyl and terphenyl; polynuclear aromatic hydrocarbons consisting of condensed rings such as binaphthyl and phenyl-naphthalenes; conjugated unsaturated heterocyclic compound having a vinyl group on a side chain such as 4-vinyl pyridine and 2-vinyl furan; and diaryl ketones such as benzophenone and phenyl naphthyl ketone.

The amount of the activator to be used is preferably in the range of 0.0001 mol to 1 mol based on 1 mol of the metallic alkali. But when the metallic alkali is finely divided into small particles such as less than $5\mu$, the reaction takes place smoothly even without addition of the activator.

Lewis base compounds which can be used in this process include ethers, acetals, and tertiary amines having no active hydrogen atom. Typical examples suitable for the process of the invention are aliphatic monoethers such as dimethyl ether and methyl ethyl ether; aliphatic polyethers such as 1,2-dimethoxy ethane and 2,2'-dimethoxy diethyl ether; cyclo ethers such as tetrahydrofuran and 1,4-dioxane; acetals such methylal and 1,1-dimethoxy ethane; and tertiary amines such as trimethyl-amine, triethyl amine and N-methylmorpholine. The amount of the Lewis base compound is more than three parts in weight per one part of the metallic alkali, and preferablly 10 to 200 parts which is decided by taking into account the fluidity and heat conductivity.

According to the process of the present invention, not only the homopolymer of conjugated diolefin, but also random or block copolymer can be prepared. When the solution containing one kind of monomer or BB fraction is fed to the reactor, a homopolymer is obtained. When a mixture solution consisting of the diluent and two or more kinds of monomer which includes at least one kind of conjugated diolefin styrene or α-methyl styrene, or a mixture consisting of BB fraction and the other monomer is introduced, random copolymer is obtained. When two or more different kinds of monomers or BB fraction and other monomer are introduced from different monomer inlets respectively, block copolymer or alternative block copolymer is provided.

The reaction mixture discharged from the outlet of the reactor contains living polymer having active carbonion substantially at both ends and when the reaction mixture is treated with a terminating reagent having an active hydrogen unit such as water, alcohol and acid, a polymer having no functional group is prepared and when the mixture is added to an electrophilic reagent such as alkylene oxide, oxygen, formaldehyde, carbon dioxide, alkylene sulfide or carbon disulfide, successively followed by treating with a terminating reagent, a polymer having a functional group such as — OH, —COOH, —SH or —CSSH group, corresponding to the kind of the electrophilic reagent, on the end of polymer chain is produced.

During the operation of introducing the functional group, the reaction mixture loses its fluidity and becomes gel or semisolid matter.

Under this condition, difficulty of uniform mixing and of prompt removal of the reaction heat results in the occurence of a chain transfer reaction or termination, even if employing powerful mixing means, and consequently sometimes, the polymer having a low value of functionality (this term means the ratio of observed content of the functional group to theoretical content of the functional group) is obtained. In order to avoid the decrease in the functionality, we made an intensive investigation and discovered that gellation begins about 12 seconds after mixing with the eletrophilic reagent and that if sufficient mixing to make a uniform mixture is performed before gellation beings, raising the temperature after gelling does not result in the decrease of the functionality. In other words, when the reaction mixture discharged from the reactor is immediately and violently mixed with the electrophilic reagent within 12 seconds by any effective mixing means and the resulting mixture is made to stand for a while for digestion at $-20°$ to $50°$ C, the polymer having functional groups on substantially each end of the polymeric chain is obtained. Generally, the functionality of the polymer produced by this method is more than 80 percent. Typical examples of the effective mixing means used for the operation of the invention include an injector or a line mixer.

A degree of molecular weight distribution of the polymer is represented by a ratio of weight average molecular weight to number average molecular weight ($\bar{M}w/\bar{M}n$) and the larger value means the broader distribution. The polymer according to the process of the invention generally has a ($\bar{M}w/\bar{M}n$) value of almost about 1 which shows an extremely narrow distribution.

The theoretical number average polymerization degree of the ideal living polymer is calculated from the following equation:

$$\bar{P}n = K[M]/[C]$$

Wherein $\bar{P}n$ expresses the number average polymerization degree, $[M]$ expresses moles of the fed monomer, $[C]$ expresses moles of metallic alkali and $K$ is 2.0 theoretically. However, when the chain transfer reaction or termination takes place, the actual observed value of the product become considerably lower than the theoretical value. The polymer according to the process of the invention generally shows good coincidence with the theoretical value.

Furthermore, the tubular reactor can be successively operated for a long period without any trouble and a uniform product is continuously produced.

EXAMPLE 1

A hundred pipes with a three-eighths inch inner diameter, 80 of schedule number and 6 m in length were connected to each other by U-type joints and thus one section of a trombone type tubular reactor having 600 m of total length was prepared. The tubular reactor was equipped with a sealed cooling bath in which liquid trifluoro monochloro methane ($CClF_3$) as a cooling medium was passed through and of which the temperature was controlled by adjusting the evaporating pressure of the cooling medium in the bath. Three sections of these tubular reactors were connected through pressure pumps and thus, the reactor having 1,800 m of a total length and 180 L of an inner volume, was constructed. Beginning from the initiator inlet, 15 monomer inlets consisting of stainless steel pipe having 1.2 mm of an inner diameter and 2.0 mm of outside diameter were inserted from the outside wall of every twenty U-type joints into the pipe (in other words 120 meter intervals) and their tops were bent to the direction of a reactant flow.

5.2 parts of sodium dispersion having 2μ of an average particle size dispersed into kerosene so as to be 40 percent of sodium concentration was mixed with 160 parts of tetrahydrofuran in a vessel provided with a cooling jacket and 36.2 parts of n-hexane solution containing 12.7 parts of butadiene-1,3 was added to the resulting mixture keeping a temperature at −74° C under a nitrogen blanket. Thus, the initiator solution including an alkali metal complex compound having an average polymerization degree of 5.2 and active carbanions on each end of the polymeric chain was prepared. The initiator solution was charged into the reactor through the initiator inlet at the rate of 201 kg/hr and 35 percent n-hexane solution of butadiene was fed into the reactor through the 15 monomer inlets in such a manner that the feeding rate of first five inlets were 5 kg/hr, the next five inlets were 8 kg/hr and the last five inlets were 11 kg/hr and thus the total feeding rate of the monomer solution was 120 kg/hr. The temperature of the reactant was controlled by the flow rate and the temperature of the cooling medium so as to be below −65° C in front of each monomer inlet and not beyond −46° C at the maximum. The linear flow rate of the reactant in the reactor was 0.6 m/sec around the initiator inlet and 1.1 m/sec around the outlet and these verocities were high enough to prevent back mixing. The polymerization mixture containing 17 percent of living polymer was discharged at the rate of 320 kg/hr and successively charged to a line mixer in which the polymerization mixture was mixed vigorously for about several seconds a 30 percent tetrahydrofuran solution of ethylene oxide fed at the rate of 39.6 kg/hr and left to stand for a while in the digestion vessel in which the temperature of the mixture went up to 20° C. The digested reaction mixture was hydrolyzed by the addition of water, said water being removed by means of centrifuging, followed by pH adjusting and absorbent treating and thus a clear solution of butadiene polymer was gained. According to the results of analysis, the butadiene polymer having a hydroxyl group which was obtained by distilling off the solvent from the above solution showed an number average molecular weight ($\overline{Mn}$) number of 1270 (determined by a vapor pressure osmometer in benzene solution) and 83.2 of a hydroxyl value. The observed average molecular weight was coincided well with the theoretical value, and a functionality calculated from the ratio of the observed hydroxyl value to the theoretical hydroxyl value based on the average molecular weight was as high as 94.0 percent.

In order to determine the weight average molecular weight, the polymer was absorbed on the absorbant, eluted by the mixed solvents of methanol and benzene with several different ratios into 40 fractions and then the average molecular weight of each fraction was determined by the vapor pressure osmometer. Weight average molecular weight ($\overline{Mw}$) calculated by the results of the elution chromatography was 1,550 and ($\overline{Mw}/\overline{Mn}$) value which represented the degree of molecular weight distribution was as low as 1.22 (ideal distribution is given as 1). Taking into account the low average molecular weight, the above value can be determined as a fairly good result.

The reactor was running for 8 days, and there was no trouble in the operation such as blocking of the reactor.

EXAMPLE 2

1.2 parts of metallic sodium fine dispersion consisting of 40 percent of sodium, 0.48 part of o-diphenyl benzene and kerosene was added to 58.3 parts of tetrahydrofuran, mixed homogeneously, and cooled to −60° C, and the resulting initiator was charged to the initiator inlet of the reactor mentioned in Example 1 at the rate of 60 kg/hr. Twenty-six percent monomer solution containing butadiene-1,3 and styrene in the ratio of 4:1 in weight and industrial gasoline (b.p. 60°–90° C) as a diluent was fed at the total feeding rate of 200 kg/hr which was equally divided and distributed into the 15 monomer inlets. The linear flow rate of the reactant was 0.17 m/sec around the initiator inlet and 0.8 m/sec around the end part of the reactor and these velocities were high enough to prevent back mixing. The temperature of the cooling bath was adjusted at −55° C. The polymerization mixture discharged from the reactor was hydrolyzed and treated by a similar procedure as described in Example 1, and thus butadiene-styrene copolymer was obtained at the rate of 49 kg/hr and in the yield of 94.2 percent. According to the results of the analysis as described in Example 1, the polymer had 3,950 as a number average molecular weight which was fairly well coincident with the theoretical value of 5,000, and 1.06 of ($\overline{Mw}/\overline{Mn}$) value. Further, the data of an infrared absorption spectrum analysis indicated that the copolymer contained 21.5 percent styrene unit.

EXAMPLE 3

3.2 parts of metallic sodium fine dispersion consisting of 40 percent of sodium and kerosene was mixed with 141 parts of tetrahydrofuran in the vessel provided with a cooling jacket and 19.0 parts of n-hexane solution containing 9.5 parts of butadiene was gradually added to the resulting mixture keeping a temperature at −78° C under a nitrogen blanket. Thus, the initiator solution including an alkali metal complex compound having an average polymerization degree of 6.5 and active carbonions on each end of the polymer chain was prepared. The initiator solution was charged into the same reactor as in Example 1 through the initiator inlet at the feeding rate of 163 kg/hr and 50 percent n-hexane solution of butadiene was fed through the first 10 monomer inlets at the feeding rate of 8, 10, 10, 12, 12, 15, 15, 15, 20 and 20 kg/hr respectively in the order from the initiator inlet.

The temperature of the cooling bath was adjusted at −78° C and the polymerization mixture containing 26 percent of the living polymer was discharged at the rate of 300 kg/hr. The mixture was introduced into an injector and mixed with 20 percent tetrahydrofuran solution of carbon dioxide which was fed at the rate of 23.6 kg/hr. The resulting mixture was added to diluted hydrochloric acid, a water layer containing salt was separated from a solvent layer by decantation, a solvent layer was treated with magnesia powder and diatomaceous earth and thus a clear solution containing butadiene homopolymer having carboxyl groups was obtained. After distilling off tetrahydrofuran and n-hexane from the solution, butadiene polymer having 2,710 as a number average molecular weight, 33.5 of a neutralization value, 81 percent of a functionality and as low as 1.10 of ($\overline{Mw}/\overline{Mn}$) value was produced.

Further, difficulties in the operation did not happen during a 7 day run.

EXAMPLE 4

Seven narrow pipes having 6 mm of an outside diameter, 4 mm of an inner diameter and 12 m of a length was wound in a coil of 40 cm diameter, connected to each other and thus the tubular reactor having a total length of 84 m provided with an initiator inlet in the one end and a reactant outlet in the other end was prepared. Seven injection needles were inserted and welded in such manner that six were from a wall of each joint connecting every pipe and one was from a wall of the pipe nearby the initiator inlet. Total inner volume of the reactor was 1.05 L and the injection needles attached to the reactor were used as the monomer inlets. The reactor was dipped in a cooling bath filled with methanol and cooled down to −78° C by solid carbon dioxide.

7.22 parts of metallic sodium fine dispersion in which 2.88 parts of sodium dispersed in kerosene was mixed with 240 parts of tetrahydrofuran and to the resulting mixture, 103 parts of mineral spirit-butadiene solution containing 36 parts of butadiene was gradually added, maintaining a temperature below −60° C and thus the initiator solution containing a complex compound having 10.6 of an average polymerization degree was prepared. Through the initiator inlet, the above initiator solution was fed at the feeding rate of 3 kg/hr and 35 percent mineral spirits solution of butadiene was fed through the seven monomer inlets at the total feeding rate of 2.06 kg/hr which were equally divided into seven inlets. The polymerization mixture was discharged at the rate of 5.06 kg/hr and led to a continuous kneader in which ethylene oxide was added at the flow rate of 0.14 kg/hr and mixed vigorously for about 8 seconds. The resulting mixture was allowed to stand for a while and dealt with in a similar manner as described in Example 1 and thus butadiene polymer having hydroxyl groups was obtained. The polymer was analyzed in accordance with a similar procedure described in Example 1 and the analytical data indicated 1,870 as a number average molecular weight, 52.8 of a hydroxyl value, 88 percent of a functionality, and 1.15 of ($\overline{Mw}/\overline{Mn}$) value. Deviation of an average molecular weight from that of theoretical value (2,000) was only 6.5 percent and accordingly it was obvious that the polymer of the process of the invention had a narrow molecular weight distribution, a high functionality and coincided well with the expected value of an average molecular weight. While the apparatus was running for 11 hours, no trouble happened during operation.

EXAMPLE 5

826 g of tetrahydrofuran was placed in a 2 L glass pressure vessel provided with a reflux condenser, a nitrogen gas inlet, a monomer inlet and a thermometer and after replacing the atmosphere with nitrogen gas completely, 279 g of 20 percent α-methyl styrene-petroleum ether solution and successively 13.6 g of 40 percent sodium dispersion were gradually added. Confirming the change of color to clear red, the mixture was cooled to −78° C and charged to the same reactor as described in Example 4 through the initiator inlet at the rate of 559 g/hr. 622 g/hr of 20 percent butadiene-petroleum ether solution was equally divided into three parts and fed through the first three monomer inlets and 127 g/hr of 20 percent α-methyl styrene-petroleum ether solution was cut in half and fed through the last two monomer inlets. The reaction mixture discharged at the rate of 1,181 g/hr was quenched with water and dealt with in a similar manner as in Example 1.

The butadiene-α-methyl styrene black copolymer thus obtained was analyzed in accordance with the similar procedure as described in Example 1 and had 2,630 as a number average molecular weight and 1.10 of ($\overline{Mw}/\overline{Mn}$) value.

Deviation of the average molecular weight of the observed value from that of the theoretical value (3,000) was extremely little and accordingly it was obvious that the polymer of the process of the invention had a narrow molecular weight distribution and a coincided well with the expected value of the average molecular weight. Further, the infrared absorption spectrum analysis indicated that the polymer included 31 percent of α-methyl stryrene unit in the polymeric chain, which coincided well with the feeding ratio (29.2 percent).

EXAMPLE 6

6.9 parts of metallic sodium fine dispersion consisting of 40 percent of sodium particles having 2μ of an average diameter and kerosene was mixed with 120 parts of tetrahydrofuran in the reaction vessel described in Example 3 and 75.7 parts of BB fraction (I) (composition was shown in Table 2) containing 30 percent of butadiene was gradually added to the resulting mixture keeping the temperature at −62° C under nitrogen blanket. Thus, the initiator solution, including the alkali metal complex compound having an average polymerization degree of 7 was prepared. The initiator solution was charged into the tubular reactor described in Example 1 through the initiator inlet at the feeding rate of 203 kg/hr and BB fraction (I) was fed through 15 monomer inlets at the rate of 8.27 kg/hr per every inlet. Temperature of the cooling bath was adjusted at −74° C and the linear flow rate of the reactant was 0.6 m/sec around the initiator inlet and 1.1 m/sec around the end part of the reactor. The polymerization mixture discharged from the reactor at the rate of 327 kg/hr was mixed with 13 kg/hr of water by means of the injector in a moment and treated as described in Example 1. From the resulting solvent layer volatile materials consisting of tetrahydrofuran, kerosene and spent BB fraction (residual BB fraction after consuming butadiene) were recovered but unreacted butadiene was not detected. After removing the volatile materials, butadiene polymer having 970 as a number average molecular weight which coincided fairly well with the theoretical value of 1,000 expected by the molecular ratio of butadiene in BB fraction to metallic alkali, 1.25 of ($\overline{Mw}/\overline{Mn}$) value was obtained at the rate of 59 kg/hr. Further, there was no trouble in the operation during an 8 day run.

EXAMPLE 7

1.42 parts of 40 percent metallic sodium dispersion was added to 205 parts of tetrahydrofuran containing 5.83 parts of α-methyl styrene at 50° C and the resulting solution was cooled to −60° C and charged into the reactor described in Example 1 through the initiator inlet at the rate of 207.3 kg/hr.

71.5 kg/hr of BB fraction (II) (its composition was shown in Table 2) containing 42 percent of butadiene was equally divided into 10 streams and fed through the first 10 monomer inlets. Therefore, the first two sections of the reactor were working as a reacting zone and the last section was working as a digesting zone. The temperature of the cooling medium was kept at −74° C and a temperature of the reactant in front of the each monomer inlet was kept at below −50° C. The polymerization mixture discharged from the reactor was mixed with the 32.5 percent tetrahydrofuran solution of ethylene oxide at the feeding rate of 10 kg/hr in the line mixer having 0.6 L of capacity for about 10 seconds. After digesting for 10 minutes in the vessel, the resulting mixture was mixed with water and dealt with as described in Example 1, and then butadiene polymer having hydroxyl groups was prepared. Butadiene content in the recovered spent BB fraction was only 0.4 percent. Analytical data indicated that the polymer had 2,650 of a number average molecular weight, 36.7 of a hydroxyl value and 1.10 of ($\overline{Mw}/\overline{Mn}$) value. Deviation of the observed average molecular weight from the theoretical value of 3,000 was extremely small and 86.7 percent of a functionality represented the substantial prevention of the chain transfer reaction.

EXAMPLE 8

7.22 parts of 40 percent metallic sodium dispersion was mixed with 324 parts of tetrahydrofuran containing 3 parts of o-diphenyl benzene in the vessel at −78° C and successively 36 parts of butadiene was added gradually to the mixture under vigorous agitation. The initiator solution having average polymerization degree of 12 prepared by the foregoing procedure was charged to a similar reactor as mentioned in Example 4 at the rate of 3 kg/hr and the monomer mixture consisting of 10 parts of BB fraction (I) and 1.2 parts of styrene was fed through seven monomer inlets at the feeding rate of 1.82 kg/hr. The polymerization mixture discharged from the reactor was mixed with a large excess amount of solid carbon dioxide immediately, excess carbon dioxide and spent BB fraction was removed from the mixture, and the mixture was treated with a procedure similar to that mentioned in Example 3. Thus, butadiene polymer having a carboxyl group was obtained. The analytical data indicated that the number average molecular weight was 1,910, weight average molecular weight was 2,200 and neutralization value was 54.8. The observed average molecular weight coincided well with the theoretical value of 2,000, ($\overline{Mw}/\overline{Mn}$) value was as low as 1.15 and a functionality was as high as 93.3 percent.

EXAMPLE 9

The initiator solution prepared by mixing 1.89 parts of 40 percent metallic sodium dispersion, 5.10 parts of biphenyl and 240 parts of tetrahydrofuran at −40° C was charged to a similar reactor as described in Example 4 through the initiator inlet at the rate of 3 kg/hr, and BB fraction (III) was fed through the seven monomer inlets at the total feeding rate of 4 kg/hr. In order to complete the polymerization, the polymerization mixture discharged from the reactor was introduced into the digesting reactor composed of a tube having 6 m of a length and 16.1 mm of an inner diameter, and the resulting mixture was treated as described in Example 6. The analytical data of the polybutadiene obtained above indicated that a number average molecular weight was 4,200 (theoretical value was 5,000) and ($\overline{Mw}/\overline{Mn}$) value was 1.04, and the recovered spent BB fraction did not include butadiene.

TABLE 2.

| Composition of BB Fraction | I | II | III |
|---|---|---|---|
| butadiene | 30.0% | 42.0% | 25.0% |
| n-butane | 18.4 | 3.0 | 22.2 |
| iso-butane | 0.8 | 0.8 | 2.7 |
| butene-1 | 15.6 | 14.5 | 18.2 |
| trans-butene-2 | 5.9 | 6.5 | 6.4 |
| cis-butene-2 | 3.8 | 4.6 | 3.9 |
| iso butylene | 25.4 | 27.5 | 21.3 |
| $C_3$ hydrocarbons | 0.1 | 0.1 | 0.3 |
| $C_5$ hydrocarbons | 0.0 | 1.0 | 0 |

EXAMPLE 10

The runs set forth in Table 3 below, were carried out using a similar reactor in a similar manner as described in Example 4 under the listed conditions.

TABLE 3-1

| | Initiator | | | | | |
|---|---|---|---|---|---|---|
| Run | Metallic alkali | Lewis base | Activator | Monomer | Polymerization degree | Feeding rate, kg./hr. |
| 10-1 | Sodium | THF | | Butadiene | 10.6 | 2.0 |
| 10-2 | do | Dimethyl ether | | do | 10.6 | 2.2 |
| 10-3 | do | 1,4-dioxane | Biphenyl | do | | 2.0 |
| 10-4 | Lithium | THF | o-Diphenyl benzene | | | 2.0 |
| 10-5 | Potassium | THF | Naphthalene | Butadiene | 6.2 | 2.0 |
| 10-6 | Sodium | THF | o-Diphenyl benzene | | | 2.0 |

TABLE 3-2

| | Monomer solution | | | | | |
|---|---|---|---|---|---|---|
| Run | Monomer (a) | Comonomer (b) | (a):(b) | Diluent | Monomer conc. percent | Feeding rate (kg./hr.) |
| 10-1 | Butadiene | Styrene | 7:3 | Pentane | 44 | 1.87 |
| 10-2 | BB fraction (I) | | | $C_4$-fraction | 30 | 2.56 |
| 10-3 | BB fraction (III) | Styrene | 8:2 | do | 25 | 3.0 |
| 10-4 | BB fraction (II) | | | do | 45 | 6.85 |
| 10-5 | Butadiene | | | Cyclohexane | 30 | 1.92 |
| 10-6 | Isoprene | | | Mineral spirit | 30 | 1.70 |

TABLE 3-3

| Run | Terminating reagent | Polymer Average molecular weight ($\bar{M}n$) Observed | Expected | $\bar{M}w/\bar{M}n$ | AV or OHV | Functionality (percent) |
|---|---|---|---|---|---|---|
| 10-1 | Aq. alcohol | 2,670 | 3,000 | 1.12 | | |
| 10-2 | Methanol | 1,880 | 2,000 | 1.12 | | |
| 10-3 | Carbon dioxide | 1,810 | 2,000 | 1.16 | AV 54.6 | 88 |
| 10-4 | Methanol | 7,050 | 8,000 | 1.05 | | |
| 10-5 | Propyrene oxide | 1,440 | 1,500 | 1.24 | OHV 74.6 | 96 |
| 10-6 | Ethylene oxide | 2,400 | 2,590 | 1.08 | OHV 43.0 | 92 |

In all runs, the reactor was running for more that 10 hours without any trouble and the anaytical data indicated that the number average molecular weights observed were all coincided well with the expected values and molecular weight distributions were extremely narrow in all cases.

COMPARATIVE EXAMPLE 1

The initiator solution having 5.2 of an average polymerization degree was prepared by mixing 5.2 parts of 40 percent metallic sodium dispersion having 6α of an average particle size, with 160 parts of tetrahydrofuran and by adding 12.7 parts of butadiene gradually at −74° C. The initiator solution was charged to a similar reactor as described in Example 1 through the initiator inlet at the rate of 178 kg/hr and pure butadiene was fed through the 15 monomer inlets at a total feeding rate of 42 kg/hr. The temperature of the reactant was adjusted at −74° C in front of every monomer inlet. The polymerization mixture discharged from the reactor at the rate of 220 kg/hr was introduced to a continuous kneader and mixed with 30 percent ethylene oxide — tetrahydrofuran solution at the rate of 39.6 kg/hr and the resulting mixture was treated by a similar procedure as described in Example 1. Thus, butadiene polymer having hydroxyl groups was prepared. However, according to the analysis of the polymer, a number average molecular weight was 1,210, in contrast to the expected value of 1,300, a weight average molecular weight was 2,120, ($\bar{M}w/\bar{M}n$) value was 1.75, a hydroxyl value was 65.2 and a functionality was 92.0 percent. In comparison with the results of Example 1, this data indicated that the polymer had a broad molecular weight distribution, and the chain transfer reaction took place remarkably. Further, delivery pressures of each pump connecting each section of the reactor were gradually increased during the operation, and fluctuation of the inner pressure of the reactor was remarkable so that the constant feeding of the monomer was extremely disturbed and finally, the operation was stopped after a 7 hour run which resulted from the blocking of the monomer inlets.

COMPARATIVE EXAMPLE 2

The production of the initiator solution having 10.6 of an average polymerization degree was performed in a similar manner as in Example 4, except to use tetrahydrofuran in lieu of mineral spirit. The initiator solution was charged to the same reactor as described in Example 4 at the rate of 3 kg/hr and 35 percent butadiene-tetrahydrofuran solution was fed through seven monomer inlets at a total feeding rate of 2.2 kg/hr. The polymerization mixture discharged from the reactor was mixed with ethylene oxide at the rate of 0.14 kg/hr and the resulting mixture was treated by a similar procedure as described in Example 4. Thus, butadiene polymer having hydroxyl groups was prepared. However, according to the analysis of the polymer, a number average molecular weight was 1,810, in contrast to the expected value of 2,000, a weight average molecular weight was 2,900, ($\bar{M}w/\bar{M}n$) value was 1.60, a hydroxyl value was 4.28 and a functionality was 69 percent. In comparison with the results of Example 4, this data indicated that the polymer had a broad molecular weight distribution and the chain transfer reaction took place remarkably. Additionally, the fluctuation of the inner pressure of the reactor during operation was so remarkable that constant feeding of the monomer was extremely difficult, and finally four monomer inlets were blocked.

We claim:

1. A continuous process for the preparation of a living polymer having a ratio of weight average molecular weight to number average molecular weight of about 1 to 1.25 comprising the steps of:

a. establishing an elongated cylindrical flow path reaction zone with a defined initiator inlet stream at one end of said flow path, the flow outlet being at the other end, with at least four spaced apart monomer inlet streams along said flow path intermediate said one and the other ends, the intervals between inlet streams being sufficient so that heat generated by the introduction of the monomer through one inlet stream is removed before the reaction mixture reaches the next inlet stream, while maintaining said flowing stream free of agitation;

b. continuously feeding through said initiator inlet streams an initiator solution containing a Lewis base compound selected from the group consisting of dimethyl ether, methyl ethyl ether, 1,2-dimethoxy ethane, 2,2′-dimethoxy diethyl, tetrahydrofuran, triethyl amine, N-methylmorpholine, 1,4-dioxane, methylate, 1,1-dimethoxy ethane, trimethyl amine, triethyle amine and N-methylmorpholine and dispersed sodium metal less than 50 μ in diameter, or a sodium metal complex compound selected from the group consisting of butadiene, aromatic compounds having a plurality of condensed rings, aromatic compounds having a plurality of non-condensed rings, styrene, α-methyl styrene, and a mixture of said dispersed alkali metal and said alkali metal complex compound;

c. continuously feeding diluted monomer containing substantially about 10 to about 70 percent by weight of butadiene and an aliphatic or cycloaliphatic liquid hydrocarbon diluent solvent having more that 4 carbon atoms through said monomer inlet streams;

d. maintaining the residence time in said reaction zone from about 20 minutes to about 2 hours while circulation a cooling medium through the reaction zone so that the temperature of the reactant is within the range of between about $-20°$ and about $-80°$ C, and a linear flow of the reaction mixture in the reactor is in the range 0.1 to 3 meters per second;

2. A continuous process for the preparation of living polymer according to claim 1 wherein the diluted monomer is $C_4$ fraction obtained by fractional distillation of cracking gas produced by cracking of petroleum fraction or by dehydrogenation of $C_4$ olefins or $C_4$ paraffins and containing at most 70 percent in weight of butadiene.

3. Continuous process for the preparation of living copolymer according to claim 2 wherein the diluted monomer consists of the $C_4$ fraction and vinyl comonomer selected from the group consisting of methyl styrene, styrene, methoxy styrene, acrylates, methacrylates and acrylnitril.

4. Continuous process for the preparation of living polymer according to claim 1 wherein the aliphatic liquid hydrocarbon diluent is selected from the group consisting of petroleum ether, solvent naphtha, gasoline, mineral spirits and kerosene.

5. Continuous process for the preparation of living copolymer according to claim 1 wherein the diluted monomer consists of conjugated diolefin, vinyl comonomer selected from the group consisting of methyl styrene, styrene, methoxy styrene, acrylates, methacrylates and acrylnitril.

6. A continuous process for the preparation of living polymer according to claim 1 wherein average particle size of the dispersed metallic alkali is less than $5\mu$.

* * * * *